United States Patent
Zemany

(10) Patent No.: US 9,210,384 B2
(45) Date of Patent: Dec. 8, 2015

(54) SYSTEM AND METHOD FOR REAL TIME REGISTRATION OF IMAGES

(71) Applicant: BAE Systems Information and Electronic Systems Integration Inc., Nashua, NH (US)

(72) Inventor: Paul D. Zemany, Amherst, NH (US)

(73) Assignee: NAE Systems Information and Electronic Systems Integration Inc., Nashua, NH (US)

( * ) Notice: Subject to any disclaimer, the term of this patent is extended or adjusted under 35 U.S.C. 154(b) by 373 days.

(21) Appl. No.: 13/971,021

(22) Filed: Aug. 20, 2013

(65) Prior Publication Data

US 2014/0078294 A1    Mar. 20, 2014

Related U.S. Application Data

(60) Provisional application No. 61/703,405, filed on Sep. 20, 2012.

(51) Int. Cl.
- H04N 7/18 (2006.01)
- H04N 5/232 (2006.01)
- H04N 5/247 (2006.01)

(52) U.S. Cl.
CPC ............. *H04N 7/18* (2013.01); *H04N 5/232* (2013.01); *H04N 5/247* (2013.01); *H04N 7/181* (2013.01)

(58) Field of Classification Search
CPC ......... H04N 7/18; H04N 7/181; H04N 5/232; H04N 5/247

USPC .......................................................... 348/159
See application file for complete search history.

(56) References Cited

U.S. PATENT DOCUMENTS

| | | | |
|---|---|---|---|
| 6,363,161 B2 | 3/2002 | Laumeyer et al. | |
| 6,707,487 B1 | 3/2004 | Aman et al. | |
| 7,006,709 B2 | 2/2006 | Kang et al. | |
| 7,613,356 B2 | 11/2009 | Uchiyama et al. | |
| 7,630,555 B2 | 12/2009 | Satoh et al. | |
| 7,689,378 B2 | 3/2010 | Kolen | |
| 7,698,094 B2 | 4/2010 | Aratani et al. | |
| 2006/0146142 A1* | 7/2006 | Arisawa | G01C 11/06 348/211.11 |
| 2011/0164137 A1* | 7/2011 | Schwartz | G08B 13/19621 348/159 |
| 2012/0194513 A1* | 8/2012 | Sakurai | G06T 15/04 345/419 |
| 2012/0229510 A1* | 9/2012 | Hayashi | A63F 13/06 345/633 |
| 2013/0176401 A1* | 7/2013 | Monari | H04N 5/2252 348/47 |

FOREIGN PATENT DOCUMENTS

JP    56-043878    4/1981

* cited by examiner

*Primary Examiner* — Allen Wong
(74) *Attorney, Agent, or Firm* — Daniel J. Long

(57) ABSTRACT

A system and method for real time registration of images is disclosed. The system measures the angle rate of change and approximates attitude difference between the two cameras to provide an estimate of the relative rate of change between the two cameras. Approximating attitude difference between the two cameras reduce the time needed for initial image registration. Real time registration of images reduces the processing load and improves tracking.

15 Claims, 3 Drawing Sheets

SYSTEM AND METHOD FOR REAL TIME REGISTRATION OF IMAGES

CROSS-REFERENCE TO RELATED APPLICATIONS

This application claims rights under 35 USC §119(e) from U.S. Application Ser. No. 61/703,405 filed 20 Sep. 2012, the contents of which are incorporated herein by reference.

TECHNICAL FIELD

Embodiments are generally related to image processing systems and methods. Embodiments are also related to image registration systems that combine two or more images from two or more different cameras into a composite image. Embodiments are additionally related to system and method for real time registration of images that reduce processing load and improve tracking.

BACKGROUND OF THE INVENTION

Image registration is the process of transforming different sets of data into one coordinate system. Data can be multiple photographs, from different sensors, from different times, or from different viewpoints. Image registration is used in computer vision, medical imaging, military automatic target recognition, and compiling and analyzing images and data from satellites. Registration is necessary in order to be able to compare or integrate the data obtained from different measurements.

Image registration involves combining two or more images, or selected points from the images, to produce a composite image containing data from each of the registered images. Real time registration of two video images from different cameras in dynamic conditions requires significant processing when such processing is done using only video data. In addition, video data is subject to blurring during fast changes in direction. This motion results in abrupt jumps or lags in final composite image. Normally the problem is solved by using image processing to register the images. Use of only image processing is compute intensive and can result in false registration.

Image processing methods commonly use 20 (Two Dimensional) convolution (x and y) or 3D (Three Dimensional) convolution (x, y, and roll). Also such methods use a direct calculation or involve a Fast Fourier Transform (FFT).

U.S Patent No: US 20120155785 A1 issued to Banner et al discloses a method of reducing blurring in an image of size greater than M columns by N rows of pixels, comprises deriving a blur kernel k representing the blur in the image, and deriving an inverse blur kernel k−1. The two dimensional matrix is convolved with the image over the whole image in the image pixel domain to produce an image with reduced blur. The method may be applied to a video sequence allowing the sequence of images to be deblurred in real time.

U.S Patent No: US 20090046160 A1 issued to Hayashi et al discloses methods for realizing a video blur detecting function include methods of detecting a video blur by means of a sensor such as an angular velocity sensor and methods of detecting it by means of a sensor and motion prediction of moving picture encoding.

The prior art processing methods are intensive. In addition they are subjected to blurring especially when the camera motion is fast. As a result there can be sudden jumps in image alignment during motion. In cases where the images have limited features, use of only image, processing can result in false registration. A need, therefore, exists for a way to reduce processing load and improve tracking.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the present invention to provide for imaging systems.

It is another aspect of the disclosed embodiment to provide for real time registration of images.

It is a further aspect of the disclosed embodiment to provide system and method for real time registration of images that reduce processing load and improve tracking and reduce the chance of false registration.

The aforementioned aspects and other objectives and advantages can now be achieved as described herein. A system and method for real time registration of images is disclosed. Such system and method reduces the processing load and improves tracking by measuring the angle rate of change and approximating attitude difference to provide an estimate of the relative rate of change between the two cameras. Approximating attitude difference between the two cameras reduces the time needed for initial image registration, limits the search space, and reduces the chance of false registration. It also prevents the system from attempting a registration process if the field of view of the cameras do not overlap.

A Micro-Electro-Mechanical System (MEMS) gyro is mounted on cameras and the outputs are used to provide rates. Accelerometers and magnetic sensors are used to provide the approximate attitude difference when two cameras have significant roll, pitch, or yaw angle differences. The accelerometers and magnetic sensors help image processing registration by limiting the search space. In addition the accelerometers provide a roll difference estimate which can aid in properly transforming the gyro rate data from one camera frame to the other camera frame. The system and method use images to get an initial image registration. Then use the gyro rates, accelerometer data and magnetic data are used to update the transformation and provide rate aiding to the image registration process. The gyros can be inexpensive since the image registration provides a drift correction.

The method reduces the search space that the image registration needs to explore and addresses the effect of blurring during rapid motion. In cases where the cameras can roll, pitch, and yaw, a three dimensional search is needed. The method provides a reduction of the volume of search space by providing a roll difference, and changes in roll, pitch and yaw angles and the related pixel shifts. The image processing used to register the images is reduced significantly. In addition by providing a direct measure of rates, the feedback process is stable and can be done at the frame rate of the cameras.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

The present invention measures the angle rate of change and approximate attitude difference to provide an estimate of the relative rate of change between the two cameras and the approximate attitude difference between the two cameras to reduce the time needed for initial image registration.

Figure 1:
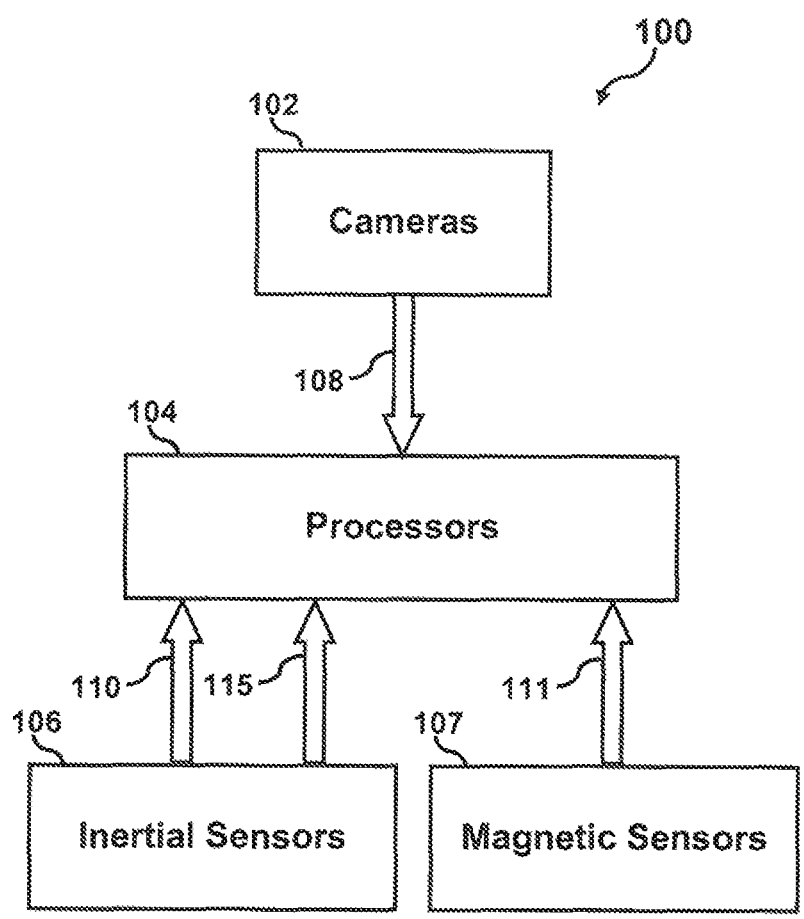
FIG. 1 illustrates a simplified block diagram depicting a real time image registration system, in accordance with the disclosed embodiments.

Referring to FIG. 1, a simplified block diagram of a real time image registration system 100 is disclosed. The system 100 includes cameras 102, inertial sensors 106, magnetic sensors 107, and processors 104. The cameras 102 are not mechanically attached and can have different roll, pitch, and, yaw angles. The cameras 102 generate images 108 that have to be registered. The inertial sensors 106 contain gyros which measure the angle rate of change data 110 of each of the cameras 102. In addition the inertial sensors 106 contain accelerometers which provide accelerometer data 115. The magnetic sensors 107 provides magnetic field data 111. The processors 104 processes the images 108 from cameras 102, the angle rate of change data 110 and accelerometer data 115 from inertial sensor 106 and magnetic field data 111 from the magnetic sensor 107. Using the magnetic field data 111 and accelerometer data 115, the processor 104 approximates the attitude difference between the cameras 102. The approximate attitude difference is used as a starting point for a process that registers the images 108 from the cameras 102. This attitude difference is also used along with the gyro data 110 to estimate the pixel shift and roll change needed to keep the images registered.

Figure 2:
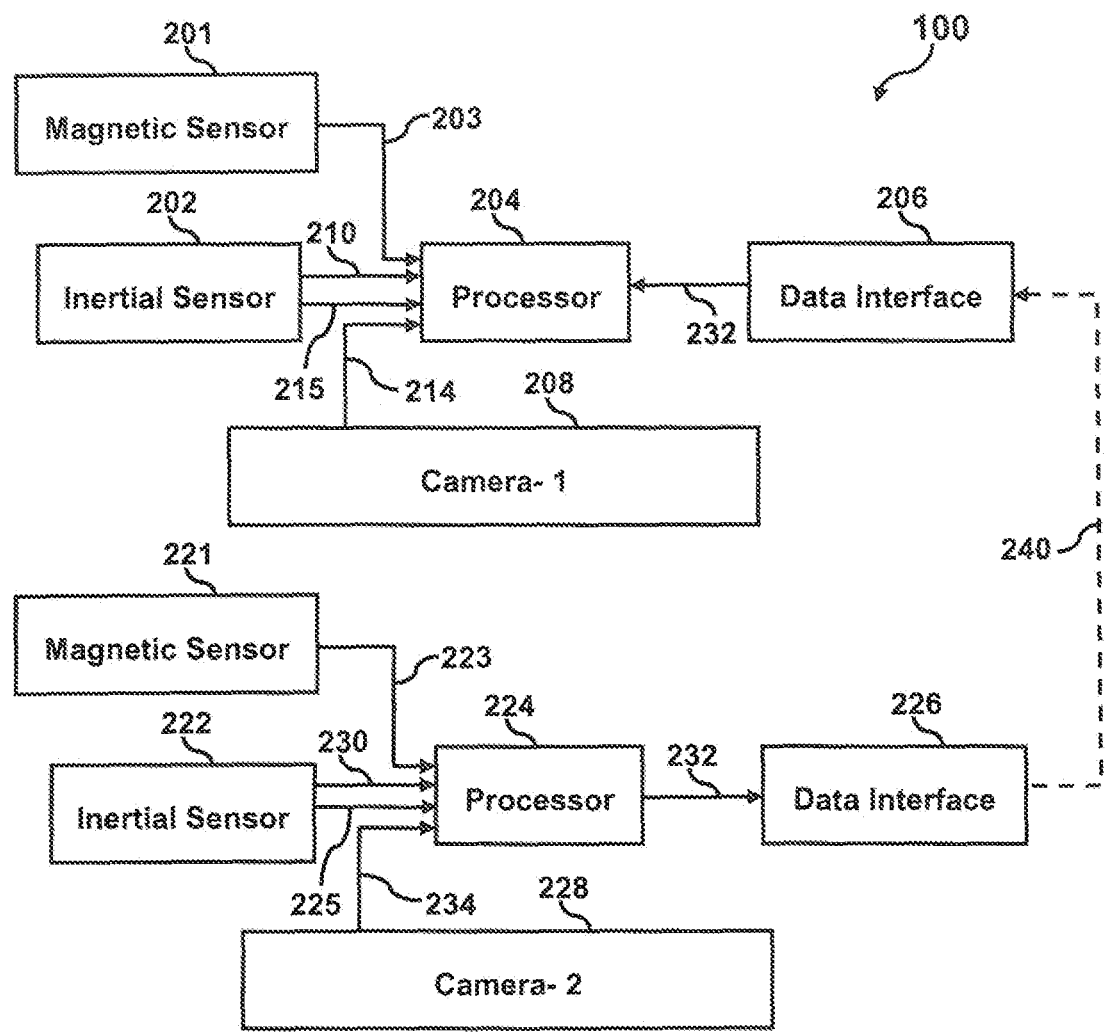
FIG. 2 illustrates a block diagram of real time image registration system depicted in FIG. 1, in accordance with the disclosed embodiments.

FIG. 2 illustrates a block diagram of real time image registration system 100 depicted in FIG. 1, in accordance with the disclosed embodiments. The system 100 is utilized to register images 234 obtained from camera 228 to images 214 obtained from camera 208. Inertial sensors 202 and 222 are mounted on cameras 208 and 228 to provide measurements of the angle rate of change data 210 and 230 and accelerometer data 215 and 225 from each camera 210 and 230 respectively. The inertial sensors 202 and 222 also measure the change in attitude at between image sample frames. Three axis magnetic sensors 201 and 221 are also mounted on cameras 202 and 228 to provide measurements of the magnetic field data 203 and 223 to the processors 204 and 224 respectively. The processors 204 and 224 uses the magnetic field data 203 and 223 along with the accelerometer data 215 and 225 to estimate the camera attitude. The processors 204 and 224 use the camera attitude and the angle rate of change data 210 and 230 from the inertial sensors 202 and 222 to provide the pixel shift and roll change needed to keep the images registered. When the system is in the tracking made, the image data 214 and 234 from cameras 208 and 228 is used in a final very limited adjustment process for registration. It is to be noted that, typically the adjustment process only needs to search over a few pixels rather than many pixels which would be needed in a process that does not use inertial and magnetic data.

Note that the inertial sensor 202 and 222 has a three axis MEMS gyro and an accelerometer. The inertial sensors 202 and 222 and magnetic sensors 201 and 221 are mounted on each camera 208 and 228 to provide rates and accelerometer data 215 and 225 and magnetic field data 203 and 223 to the processor in order to reduce the search space that the image registration needs to explore and addresses the effect of blurring during rapid motion.

In an initialization process the images produced by the cameras 208 and 228 are registered by using a typical image registration method such as the ones described by Zitova and Flusser, Image and Vision Computing 21 (2003) 977-1000. The inertial sensors 202 and 222 and magnetic sensors 201 and 221 aid the image registration process by providing an approximate starting point. Thus, for example, the roll difference between the cameras 208 and 228 can be provided. This can allow the registration process to perform an initial two dimensional (2D) search over azimuth and elevation instead of a full three dimensional (3D) search. The approximate frame information aid in initial registration by reducing the search space or image size.

After initialization, the angle rate of change data 210 and 230 from the inertial sensors 202 and 222 are used to compute the changes in the registration caused by camera motion. Thus, the computation provides the horizontal shift, vertical shift, and roll angle shift needed to re-register the image 234 from camera 228 to the image 214 from camera 208.

Note that the inertial sensors and magnetic sensors, are also referred as rate and attitude sensors. A MEMS gyro is mounted on the cameras and the outputs are used to provide rates. Accelerometers and magnetic sensors are used to provide the approximate attitude difference if the two cameras have significant roll, pitch, or yaw angle differences. The orientations of the cameras can be in North, East, Down (NED) frame or any other camera frame to changes to the other camera frame. Also note that the system has at least two cameras for example video cameras that collect images at a high frame rate. The processors can also be any hardware that contains algorithms for image registration. Additional algorithms such as Kalman filter estimation or state estimation can be employed to combine the image registration results and the attitude sensor data. This allows the bias error in the transformation from camera 208 to camera 228 to be estimated and will result in a more accurate change estimate.

The system 100 depicted in FIG. 2 contains at least two cameras 208 and 228 that collect images 214 and 234 at a high frame rate. The resulting images 214 and 234 are read by processors 204 and 224. Magnetic sensors 201 and 221 and inertial sensors 202 and 222 provide magnetic field data 203 and 223, accelerometer data 215 and 225 and angle rate of change data 210 and 230 to the processors 204 and 224 respectively. The processors 204 and 224 use the magnetic field data along with the angle rate of change data 210 to estimate attitude of camera 208. The processor 224 uses the magnetic field data 223 along with the angle rate of change data 230 to estimate attitude of camera 228. The attitude estimate and image 234 from camera 228 represented as processed data 232 is sent to processor 204 via a data link 240. Data interfaces 206 and 226 can be utilized for sending the processed data 232 from the processor 224 to the processor 204 via the data link 240. The processor 204 provides an estimate of the relative shift in horizontal and vertical pixels and roll angle change between image samples. The processor 204 then registers the most recent image samples using the estimated changes. The estimated changes and the most recent image samples are inputs to the image registration algorithm.

The system provides reduced complexity of the image registration process leading to a smaller processor, lower weight, and less power use. Also the system provides faster and more reliable initialization and ability to maintain track during fast camera slewing that would normally cause blurring for the approaches using only image data. The method also prevents images from being falsely registered by constraining the search space in both the initialization and tracking modes.

Figure 3:
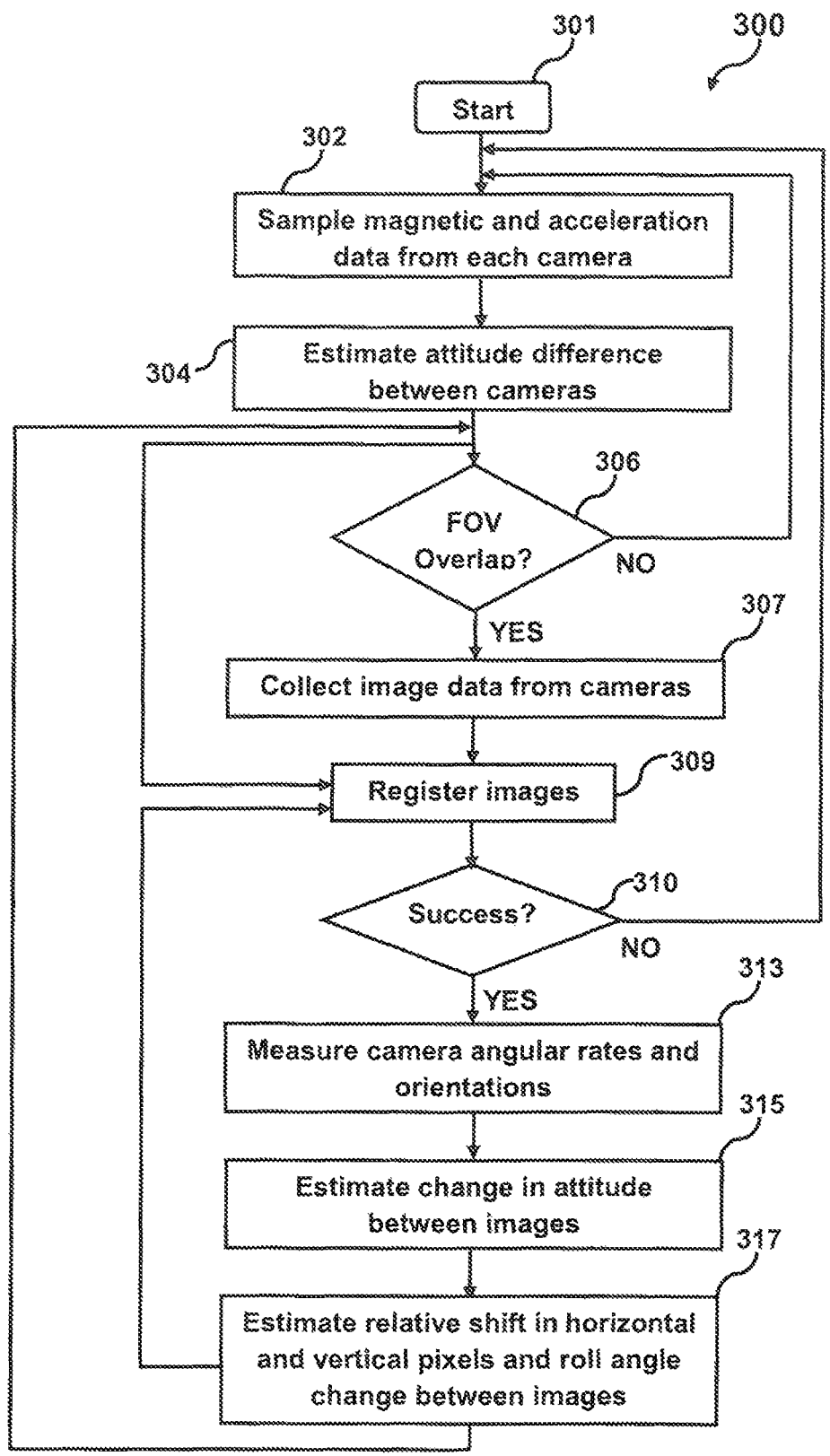
FIG. 3 illustrates a flow chart depicting the process of registering images in real time, in accordance with the disclosed embodiments.

FIG. 3 illustrates a flow chart depicting the process 300 of registering images in real time by utilizing system 100 depicted in FIG. 1 and FIG. 2, in accordance with the disclosed embodiments. As said at the block 301, the process 300 starts. The magnetic and acceleration data from the magnetic sensor and accelerometer are sampled as said at block 302. Then as illustrated at block 304, the attitude difference between the cameras is estimated based on magnetic and acceleration data. As depicted at block 306, a test is performed to checks whether the camera Fields Of Views (FOV) overlaps. If there is no overlap the process loops back to the start mode. If the FOVs overlap, then as said at block 307, the images from cameras are collected. Either the approximate attitude difference or a refined estimate is utilized to register collected the images. As said at block 309, the approximated attitude difference estimated at block 304 is utilized initially for image registration. Since it is a rough estimate, longer period of time is taken to register the images. Once the loop is started the refined shift estimate is utilized for image registration. The refined shift estimate reduces the amount of processing and also prevents the system from obtaining a registration error. If there is registration error the process loops back to the start mode.

It is possible that the camera FOVs to move out of the overlap region. As depicted at block 310, again a test is performed to checks whether the camera Fields Of Views (FOV) overlaps. If the FOVs no longer overlap, the system goes back to the start mode. If the FOVs overlap, then as illustrated at block 313, the camera angular rates and orientations are measured. The change in attitude between images is estimated as said at block 315. The relative shift in horizontal and vertical pixels and roll angle change between the image samples is estimated as depicted at block 317. The blocks 313, 315, and 317 provide the next value of the refined shift estimate to re-register images at the camera frame rate. The images are re registered by utilizing refined shift estimate as said at block 309. Then, the test at block 306 is performed to checks whether the camera Fields Of Views (FOV) overlaps until the user stops the process 300.

Those skilled in the art will appreciate that the method of the present invention uses directly measured rate data to aid the image processing. This reduces processing and power use and addresses image blurring that would challenge image registration.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for real time registration of two video images from two cameras, comprising the steps of:
measuring an angle rate of change and attitude change of the two cameras;
providing an estimate of relative change between the two cameras based on measured attitude change, wherein the estimate of relative change is utilized in initial image registration process to reduce processing load needed to keep two image frames registered;
providing an estimate of relative change between the two cameras based on measured angle rate of change; and
registering two video images based on the estimated relative change between two cameras based on measured angle rate of change.

2. The method of claim 1 wherein the estimate of relative change between the two cameras based on measured angle rate of change comprises a relative shift in horizontal and vertical pixels and roll angle change between the two video images.

3. The method of claim 1 wherein search space that must be covered in an image processing method is reduced, thereby reducing chance for a false registration.

4. The method of claim 1 wherein at least one accelerometer and at least one magnetic sensor are utilized to measure the attitude change of the two cameras and at least one gyro is utilized to measure the angle rate of change of the two cameras.

5. The method of claim wherein the searching is prevented in an image processing method when the field of view of the cameras does not overlap by utilizing the accelerometer and the magnetic sensor.

6. A method for real time registration of two video images from two cameras, comprising the steps of:
measuring an angle rate of change and attitude change of the two cameras;
providing an estimate of relative change between the two cameras based on measured attitude change, wherein the estimate of relative change is utilized in initial image registration process to reduce processing load needed to keep two image frames registered;
providing an estimate of relative change between the two cameras based on measured angle rate of change; and
registering two video images based on the estimated relative change between two cameras based on measured angle rate of change, wherein the estimate of relative change between the two cameras based on measured angle rate of change comprises a relative shift in horizontal and vertical pixels and roll angle change between the two video images, and processing load needed to keep two image frames registered is reduced.

7. The method of claim 6 wherein search space that must be covered in an image processing method is reduced, thereby reducing chance for a false registration.

8. The method of claim 6 wherein at least one accelerometer and at least one magnetic sensor are utilized to measure the attitude change of the two cameras and at least one gyro is utilized to measure the angle rate of change of the two cameras.

9. The method of claim 6 wherein the searching is prevented in an image processing method when the field of view of the cameras does not overlap by utilizing the accelerometer and the magnetic sensor.

10. A system for real time registration of video images, comprising
at least one accelerometer and at least one magnetic sensor utilized to measure attitude change of the two cameras;
at least one gyro utilized to measure angle rate of change of the two cameras;

at least one processor for providing an estimate of relative change between the two cameras based on measured attitude change, wherein the estimate of relative change is utilized in initial image registration process to reduce processing load needed to keep two image frames registered, providing an estimate of relative change between the two cameras based on measured angle rate of change and registering two video images based on the estimated relative change between two cameras based on measured angle rate of change.

11. The system of claim 10 wherein estimate of relative change between two cameras comprises relative shift in horizontal and vertical pixels and roll angle change between two video images.

12. The system of claim 11 reduces processing load needed to keep two image frames registered.

13. The system of claim 11 reduces search space that an image processing method must cover thereby reducing chance for a false registration.

14. The system of claim 11 wherein at least one inertial sensor comprising at least one accelerometer and at least one magnetic sensor is utilized to measure said angle rate of change.

15. The system of claim 11 wherein the searching is prevented in an image processing method when the field of view of the cameras does not overlap by utilizing said inertial sensor.

* * * * *

UNITED STATES PATENT AND TRADEMARK OFFICE
CERTIFICATE OF CORRECTION

PATENT NO. : 9,210,384 B2  
APPLICATION NO. : 13/971021  
DATED : December 8, 2015  
INVENTOR(S) : Paul D. Zemany It is certified that error appears in the above-identified patent and that said Letters Patent is hereby corrected as shown below:

On the title page, item (73), please delete "NAE Systems Information and Electronic Systems Integration Inc." and insert therefor --BAE Systems Information and Electronic Systems Integration Inc.--

Signed and Sealed this  
Twenty-sixth Day of April, 2016

Michelle K. Lee  
*Director of the United States Patent and Trademark Office*